United States Patent Office 3,093,599
Patented June 11, 1963

3,093,599
FLAMEPROOFED SYNTHETIC THERMOPLASTIC POLYMER CONTAINING AN ORGANIC POLYBROMINE COMPOUND AND METHOD OF MAKING SAME
Heinz Mueller-Tamm, Karl Buchholz, and Fritz Stastny, all of Ludwigshafen (Rhine), Germany, assignors to Badische Anilin- & Soda-Fabrik Aktiengesellschaft, Ludwigshafen (Rhine), Germany
No Drawing. Filed Aug. 16, 1960, Ser. No. 49,822
Claims priority, application Germany Aug. 22, 1959
16 Claims. (Cl. 260—2.5)

This invention relates to the flameproofing of plastics and more particularly to the flameproofing of synthetic thermoplastic polymers with certain organic polybromine compounds. The invention relates especially to the flameproofing of granular or bead-like expandable styrene polymers.

It is known that readily flammable plastics can be made difficulty flammable by the addition of halogen compounds. Flamproofed plastic compositions are important, especially for the production of porous thermoplastics, for example of expanded materials from styrene polymers.

Halogen compounds which are known to be suitable as agents for the flameproofing of plastics include highly chlorinated non-volatile hydrocarbon compounds. They are preferably used together with antimony trioxide. It is a disadvantage that relatively large amounts of chlorinated hydrocarbons, as a rule 15 to 20% of the amount of plastic, must be used in order to achieve a satisfactory flameproofing effect. In the important field of the manufacture of expanded articles from granular or bead-like expandable thermoplastics, this disadvantage is especially serious. The high content of halogen compound renders welding of the granular or bead-like compositions difficult. Expanded articles of low mechanical strength are often obtained.

Organic bromine compounds are known to be much more effective than the corresponding chlorine compounds. It is not possible, however, to use all bromine compounds as flameproofing agents. Bromine compounds which are known to be suitable agents for the flameproofing of plastics include tetrabromobutane dibromethylbenzene and dibromopropanol. In general they are used in amounts of 5 to 10% with reference to the amount of plastic.

Suitable compounds for the flameproofing of plastics must, above all, have the following properties:

They must be difficulty volatile and odorless and must not detrimetally affect the mechanical properties of the plastics. They must be sufficiently effective in the smallest possible amounts. They must not promote corrosion and, if possible, should be of a nature which permits their addition to the monomeric compounds prior to polymerization without interfering with the course of polymtrization.

Hardly any of the organic bromine compounds that are known to have a flameproofing effect are possessed of all these properties to a sufficient extent. Some of the compounds are volatile so that the plastics treated with the same lose their flame resistance after some time. Some of the compounds have an unpleasant odor. A large number of known bromine compounds have a plasticizing effect. For the production of expanded materials from granular or bead-like expandable thermoplastics, flameproofing agents with plasticizing properties are unsuitable because they yield expanded articles of insufficient compressive strength and volume stability. Moreover, most organic bromine compounds interfere with the polymerization of monomeric polymerizable compounds. They cannot, therefore, be mixed with the monomers, but only with the finished plastics.

It is an object of this invention to provide flameproofed plastic compositions which do not lose their flame resistance in storage. A further object of this invention is to provide flameproofed plastic compositions which are odorless and do not promote corrosion. A further object of this invention is to provide flameproofed plastic compositions whose mechanical properties are not detrimentally affected by the admixture of the flameproofing agent. An especially important object of this invention is to provide granular or bead-like flameproofed expandable styrene polymer compositions whose softening points remain practically unchanged on admixture of the flameproofing agent. Another object of this invention is to provide a simple process for the production of flameproofed plastic compositions by adding a flameproofing agent to monomeric polymerizable compounds without interfering with the course of polymerization.

The objects of this invention are achieved by a plastic composition comprising a readily flammable synthetic thermoplastic polymer and a brominated butadiene or isoprene polymer of a polymerization degree of 2 to 2000 in such an amount that the bromine content of the composition is at least 0.5% by weight with reference to the amount of synthetic resin.

The bromine compounds according to the present invention may be used up to amounts corresponding to 6% by weight of bromine with reference to the amount of synthetic resin.

Butadiene or isoprene polymers of a polymerization degree of 2 to 2000 are obtained from the monomers for example with the aid of alkali metals, peroxide compounds or aluminum trialkyls, in the form of readily mobile to viscous liquids. They are straight-chain compounds, such as hexadecane-tetraene (tetrameric butadiene) and viscous alkali metal polymers of butadiene, or cyclic compounds, such as cyclododecatriene (trimeric butadiene) and vinyl cyclohexene (dimeric butadiene). They contain one double linkage per monomer molecule. Bromination at first ensues from the addition of bromine to the said double linkages. The brominated polymer consequently contains at least two bromine atoms per monomer molecule. Further bromination may, however, result from the substitution of hydrogen by bromine. Bromination may be carried out according to known methods. The bromine content of the resultant products may vary between about 70 and 82% weight. The bromine compounds are viscous to solid depending on the degree of polymerization and the degree of bromination of the initial materials.

Bromine compounds that are particularly suitable for the flameproofing of plastics include brominated linear polybutadienes of a polymerization degree of 3 to 10 and brominated cyclic polybutadienes, such as hexabromocyclododecane. The good flameproofing properties of the bromine compounds according to the present invention become apparent on comparison of the amounts of different bromine compounds which are necessary to impart the same degree of flame resistance to, for example, polystyrene. 100 parts by weight of plastic composition must contain 10 parts of pentabromotoluene, 8 to 9 parts of tri-(dibromopropyl)-phosphate, 5 to 6 parts of dibromethylbenzene or 1 to 2 parts of hexabromocyclododecane in order to have the same degree of flame resistance.

It is of advantage especially in the manufacture of expanded articles from expandable granular or bead-like styrene polymers that only small amounts of flameproofing agent are required. The expanded materials are not weighted by the flameproofing agent and can, therefore, be produced with practically the same bulk densities as expanded materials without flameproofing additions.

Moreover, the said small amounts of flameproofing agent cannot produce an appreciable plasticizing effect. Expanded polystyrene which has been flameproofed by means of the bromine compounds according to the present invention therefore shows good compressive strength and volume stability.

Flameproofing agents according to the present invention are practically odorless. They have a very low vapor pressure and thus do not volatilize. Flameproofed compositions which contain the said bromine compounds do not lose their flame resistance even after prolonged storage periods.

It is assumed that the flameproofing effect of organic bromine compounds is due to their tendency to split off hydrogen bromide. For this reason, the temperature range in which hydrogen bromide is split off is also of importance for the suitability of the said bromine compounds as flameproofing agents. Brominated butadiene or isoprene polymers do not give off hydrogen bromide below 170° C. They do not, therefore, have a corrosive effect as is the case with for example, tetrabromobutane or tribromopropane, which tend to split off hydrogen bromide even at low temperatures. Splitting off of hyrogen bromide from brominated butadiene or isoprene polymers begins at above 170° C. and is vigorous at 190° C. On account of this behavior, the said substances are well suited for use as flameproofing agents.

Readily flammable plastics, such as synthetic thermoplastic polymers, e.g. polymers and copolymers of ethylene, propylene, acrylonitrile, acrylic acid esters, methacrylic acid esters and vinyl acetate, can be flameproofed with the bromine compounds according to the present invention. The use of the bromine compounds according to the present invention is of particular advantage in the flameproofing of styrene polymers, such as polystyrene, and copolymers from styrene and acrylonitrile.

The production of the flameproofed compositions may be carried out in various manners. For example, intimate mixtures of plastics and flameproofing agents according to the present invention may be prepared by mixing the plastic and the bromine compound at an elevated temperature, but below 170° C., in an extrusion press or a kneader. The two components may also be dissolved in a common solvent and the latter subsequently removed. A particularly advantageous method is the polymerization of monomeric polymerizable compounds to which the flameproofing agent is added prior to polymerization. This method is of special interest in the production of bead-like expandable styrene polymers containing readily volatile aliphatic hydrocarbons as expanding agents and is preferably carried out in aqueous suspension. In other methods, the initial preparation of intimate mixtures may be dispensed with. In the case of granular or bead-like plastic compositions, the surface of the granulate may be coated. This method can also be used for the flameproofing of expandable granular plastic compositions, such as bead-like styrene polymers containing readily volatile hydrocarbons. Some of the various methods for the preparation of flameproofed compositions are illustrated by the following examples, but the invention is not limited to these examples. The parts specified in the examples are parts by weight.

*Example 1*

30 parts of hexabromocyclododecane and 3 parts of benzoyl peroxide are dissolved in 1000 parts of styrene. The solution is suspended in 2000 parts of water containing 7 parts of barium sulfate in finely particled form and is kept, while stirring, for 20 hours at 70° C. and for 10 hours at 80° C. Beads of 0.2 to 1.0 mm. diameter are formed, which are separated from the liquid and dried. By injection molding at 160° C., molded articles are obtained which will burn only in an extraneous flame and are extinguished immediately after removal of the flame.

*Example 2*

25 parts of octabromohexadecane and 3 parts of benzoyl peroxide are dissolved in a mixture of 800 parts of styrene and 200 parts of acrylonitrile. The solution is suspended in 2000 parts of water containing 7 parts of barium sulfate as a suspension stabilizer and is polymerized for 20 hours at 70° C. and for 10 hours at 80° C. The polymer particles formed are separated, washed and dried.

By injection molding, clear molded articles are obtained which are flame-resistant and solvent-stable. They will burn only in an extraneous flame and are extinguished immediately after removal of the flame.

*Example 3*

20,000 parts of water, 60 parts of a copolymer derived from 95% of N-vinyl pyrrolidone and 5% of methyl acrylate, 2 parts of sodium pyrophosphate, 19,400 parts of styrene, 1,500 parts of pentane, 62 parts of benzoyl peroxide, 600 parts of octabromohexadecane are placed in a stirrer-type pressure vessel and, after forcing in nitrogen up to a pressure of 2 atmospheres, are polymerized by stirring for 20 hours at 70° C. and for 10 hours at 80° C. The resultant polymer has the form of globules with diameters of 0.5 to 3 mm. It is separated, washed and dried in an air current at 50° C. On heating in steam or boiling water, the polymer particles thus obtained expand to 40 times their original volume. By further heating in perforated molds, they may be processed into blocks, panels or molded articles of any dimensions. The density of the expanded articles is from 15 to 20 kg./cubic meter. After the expanding agent has evaporated, the expanded articles will burn only with difficulty and are automatically extinguished after removal of the extraneous flame.

*Example 4*

400 parts of vinyl carbazole, 350 parts of styrene, 250 parts of acrylonitrile, 30 parts of hexabromocyclododecane, 4 parts of benzoyl peroxide, 80 parts of pentane. 2000 parts of water, 3 parts of a copolymer derived from 95% of vinyl pyrrolidone and 5% of methyl acrylate and 1 part of sodium pyrophophate are polymerized, while stirring, in a stirrer-type autoclave after forcing in nitrogen up to a pressure of 2 atmospheres. The polymer is processed in the manner described in Example 3. On heating with steam, the particles expand to 30 to 40 times their original volume. The softening point of expanded articles which can be prepared from the said particles is about 45° C. higher than that of styrene homopolymers. They are solvent-stable and flame-resistant.

*Example 5*

A mixture of 20 parts of polystyrene, 80 parts of styrene, 6 parts of pentane, 3 parts of brominated butadiene polymer (obtained from butadiene by alkali metal polymerization to a polymerization degree of 250 to 300 and bromination; bromine content 67% by weight) and 3 parts of benzoyl peroxide is charged into a sheet metal container. The container is closed and kept for eight weeks at 24° to 35° C. The contents polymerize to form a solid block. The polymer is ground and can be processed, in the manner described in Example 3, into flame-resistant expanded articles with densities of 0.015 to 0.02.

*Example 6*

680 parts of styrene, 0.7 part of divinyl benzene, 21 parts of brominated butadiene polymer (obtained by thermal polymerization of butadiene; polymerization degree 50 to 100; bromine content 70% by weight), 90 parts of dichlordifluoromethane and 3.8 parts of azodi-isobutyronitrile are heated in an autoclave for 250 hours at 50° C. A hard, colorless and slightly cross-linked polymer is obtained, which can be expended to a density of 0.02. The expanded articles show distinctly increased thermal stability as compared with polymers which are not cross-linked. They will burn only in an extraneous flame.

Example 7

2000 parts of water, 6 parts of a copolymer derived from 95% of vinyl pyrrolidone and 5% of methyl acrylate, 1 part of sodium pyrophosphate, 1940 parts of methyl methacrylate, 150 parts of pentane, 6 parts of benzoyl peroxide and 60 parts of brominated cyclododecatriene are treated as described in Example 2. The resultant expandable methyl polymethacrylate particles can be processed into expanded articles with a density of about 0.02 which, after evaporation of the expanding agent, will burn only in an extraneous flame. They are extinguished immediately after removal of the flame.

The same batch, but without the addition of pentane, leads to a granular product which can be processed into any kind of molded articles by injection molding. They are flame-resistant and suitable as insulating structural parts in electrical engineering.

Example 8

1000 parts of polystyrene are mixed on rolls at 140° C. with 30 parts of brominated natural rubber which has been degraded by mastication and thermal treatment to a polymerization degree of about 250 (bromine content 68% by weight). The mixture is comminuted to form particles of 1 to 3 mm. diameter. The particles are treated in a pressure vessel with a mixture of 5000 parts of water and 80 parts of petroleum ether with a boiling range of 45° to 50° C. for 96 hours at 30° to 40° C., while stirring. After drying for a short time in the air, the particles can be expanded and sintered in perforated molds by heating with steam. Flame-resistant expanded articles are obtained.

Example 9

95 parts of bead-like expandable polystyrene containing about 6% of pentane as an expanding agent are provided with a uniform sticky coating by mechanical mixing with 4 parts of a solution of 3 parts of brominated cyclododecatriene in 1 part of a viscous chlorinated paraffin (viscosity of the solution: about 8000 centipoises at 25° C.). Then 1.5 parts of silicic acid of 0.1 to 1 micron particle size are uniformly distributed over the sticky granular composition by further mixing. Free-flowing granules with a flame-resistant coating are obtained, which can be processed into difficultly flammable expanded articles. The expanded articles will burn only in an extraneous flame and are extinguished immediately after removal of the flame.

Instead of the highly viscous mixture of brominated cyclododecatriene and chlorinated parafin, a viscous solution of the bromine compound in other solvents, such as acetone, dimethylformamide or chlorbenzene, may be used.

Example 10

92 parts of bead-like expandable polystyrene with 5% of pentane and 3% of cyclohexane as expanding agents are intimately mixed in a high-intensity mixer with 3.5 parts of a solution of 3 parts of brominated cyclododecatriene and 0.5 part of acetone. Then 5 parts of very finely pulverized polystyrene of the k-value 20 are added are added and mixing is continued until free-flowing granules have formed. 1000 parts of the resultant coated granules, 1000 parts of water and 10 parts of polyvinyl pyrrolidone are charged into a pressure vessel and heated for 3 hours at 80° C. at 3 atmospheres gage nitrogen pressure, while stirring. After cooling, the granules, which have a smooth hard surface, are separated and dried. They may be processed into flame-resistant expanded articles.

Example 11

7750 parts of styrene in 24,000 parts of water containing 120 parts of polyvinyl pyrrolidone as a protective colloid and 5 parts of sodium pyrophosphate as a buffer, together with 567 parts of pentane and 30 parts of azodi-isobutyronitrile are polymerized in a 50 liter pressure vessel, while stirring, for 40 hours at 60° to 90° C. and a nitrogen pressure of 3 atmospheres to form a bead-like expandable composition. The reaction mixture is cooled and, after the addition of 25 parts of normal butanol, stirred for another 15 minutes. A mixture of 1550 parts of styrene, 800 parts of brominated cyclododecatriene, 6 parts of azodi-isobutyronitrile and 131 parts of pentane suspended in 2400 parts of water with 36 parts of polyvinyl pyrrolidone is added to the reaction mixture. After forcing in nitrogen up to a pressure of 3 atmospheres, the whole is heated to 80° to 90° C. while stirring. A bead-like expandable styrene polymer is obtained. In the second stage, the bromine compound is uniformly distributed over the surface of the preformed beads and fixed in the form of a hard coating. The expandable polymer may be processed into flameproof expanded articles.

Example 12

A homogeneous pulverulent mixture is obtained by melting and mixing 2 parts of paraffin wax (melting point 70° C.), 2 parts of rosin and 3 parts of brominated cyclododecatriene (74% by weight of bromine), allowing the melt to solidify and pulverizing the product. The powder, together with 93 parts of a bead-like polystyrene containing about 7% of pentane as an expanding agent, is placed in a mixing drum. Uniform powdery coatings are produced on the beads by mixing. With the mixer still running, hot air of 80° C. is blown in for 3 to 5 minutes, and then the beads are cooled by blowing in cold air. Free-flowing beads with a firmly adherent flame-resistant coating are obtained, which may be processed into pressure-resistant, volume-stable expanded articles.

Example 13

30 parts of paraffin wax (melting point 70° C.), 30 parts of brominated crystalline cyclododecatriene and 1000 parts of bead-like expandable polystyrene containing 7% of pentane as an expanding agent are stirred in a pressure vessel for 30 minutes at 80° C. at a nitrogen pressure of 3 atmospheres. Prior to cooling, 1 part of polyvinyl pyrrolidone is added. The granular composition is separated from the aqueous phase and dried. Free-flowing expandable beads are obtained, which have a uniform coating of paraffin wax and brominated cyclododecatriene.

Example 14

950 parts of polyethylene (molecular weight about 52,000) are worked on rolls at 135° C. until the material has become plastic. Then 50 parts of cyclododecatriene hexabromide are added and homogeneously mixed with the polyethylene by rolling. The rolling sheet is comminuted and may be processed into any kind of injection moldings. The moldings will burn only with difficulty and are extinguished after the extraneous flame has been removed.

As will be evident from the foregoing specification and examples, the term "expanded" is employed herein with reference to an expanded polymer, i.e. a thermoplastic polymer which has been combined with an expanding agent or blowing agent and heated to give a foamed cellular polymer product. Likewise, the term "expandable" is employed with reference to an expandable polymer composition, i.e. the combination of the thermoplastic polymer, usually in bead or granular form, with the expanding agent. Thus, the present invention is particularly directed to the combination of a particular class of organic polybromine compounds as a flameproofing agent with either the expandable polymer composition or the expanded polymer product.

We claim:

1. A flameproofed plastic composition comprising (A) a synthetic thermoplastic polymer selected from the group consisting of polystyrene, polymethylmethacrylate, polyethylene and copolymers of styrene and at least one member selected from the group consisting of acrylonitrile, vinylcarbazole and divinylbenzene, and (B) an organic polybromine compound selected from the group consisting of brominated butadiene and isoprene polymers of a polymerization degree of 2 to 2000, the amount of said bromine compound being such that the bromine content of the composition, based on said thermoplastic polymer, is at least 0.5% up to about 6% by weight.

2. A composition as claimed in claim 1 wherein said organic polybromine compound has a bromine content of about 70 to 82% by weight.

3. A composition as claimed in claim 1 wherein the polybromine compound is hexabromocyclododecane.

4. A composition as claimed in claim 1 wherein the polybromine compound is a brominated linear polybutadiene of a polymerization degree of 3 to 10.

5. A composition as claimed in claim 4 wherein the polybromine compound is octabromohexadecane.

6. An expandable flameproofed plastic composition comprising a granular expandable styrene polymer and an organic polybromine compound selected from the group consisting of brominated butadiene and isoprene polymers of a polymerization degree of 2 to 2000 in such an amount that the bromine content of the composition, based on the styrene polymer, is at least 0.5% up to about 6% by weight.

7. A composition as claimed in claim 6 wherein said granular expandable polymer contains an aliphatic hydrocarbon expanding agent.

8. A process for flameproofing plastics which comprises mixing (A) a synthetic thermoplastic polymer selected from the group consisting of polystyrene, polymethylmethacrylate, polyethylene and copolymers of styrene and at least one member selected from the group consisting of acrylonitrile, vinylcarbazole and divinylbenzene, with (B) an organic polybromine compound selected from the group consisting of brominated butadiene and isoprene polymers of a polymerization degree of 2 to 2000, in such an amount that the bromine content of the mixture, based on the thermoplastic polymer is at least 0.5% up to about 6% by weight.

9. A process as claimed in claim 8 wherein said mixing is accomplished by first adding the polybromine compound to the monomeric reactant of said thermoplastic polymer, and subsequently forming said thermoplastic polymer by polymerization of the monomeric reactant in the presence of said polybromine compound.

10. A process as claimed in claim 9 wherein a styrene polymer is formed by polymerization of monomeric styrene in the presence of said polybromine compound.

11. A process as claimed in claim 10 wherein an expandable styrene polymer is formed by polymerization of monomeric styrene in the presence of said polybromine compound and a volatile hydrocarbon expanding agent.

12. A process as claiced in claim 11 wherein the polymerization of said monomeric styrene is carried out in aqueous suspension.

13. A process as claimed in claim 8 wherein said polybromine compound is hexabromocyclododecane.

14. A process as claimed in claim 8 wherein said polybromine compound is a brominated linear polybutadiene of a polymerization degree of 3 to 10.

15. A process as claimed in claim 14 wherein said polybromine compound is octabromohexadecane.

16. A flame-resistant expanded thermoplastic article comprising a foamed cellular styrene polymer containing as a flameproofing agent an organic polybromine compound selected from the group consisting of brominated butadiene and isoprene polymers having a polymerization degree of 2 to 2000 and a bromine content of about 70 to 82% by weight, said polybromine compound being present in said article in such an amount that the bromine content of said article, based on the styrene polymer, is at least 0.5% up to about 6% by weight.

References Cited in the file of this patent

UNITED STATES PATENTS

| | | |
|---|---|---|
| 2,465,336 | MacDonald et al. | Mar. 29, 1949 |
| 2,833,734 | Morrisey et al. | May 6, 1958 |
| 2,900,292 | Coleman et al. | Aug. 18, 1959 |
| 2,933,117 | Baldwin et al. | Apr. 19, 1960 |